Patented Dec. 10, 1946

2,412,476

UNITED STATES PATENT OFFICE 2,412,476

TREATMENT OF ACRYLIC ESTER POLYMERS

Stephen T. Semegen, Akron, Ohio, assignor to The B. F. Goodrich Company, New York, N. Y., a corporation of New York No Drawing. Application October 25, 1945, Serial No. 624,586

18 Claims. (Cl. 260—83)

This invention relates to a method for curing acrylic ester polymers, and pertains more specifically to a method for transforming such polymers from soft plastic materials to tough resilient products, similar to vulcanized rubber.

I have found that such transformation may be accomplished by dispersing in the polymer a small amount of an alkali metal salt of vanadic acid and heating the resulting composition. Although any alkali metal vanadates may be employed such as the lithium, potassium, or sodium vanadates, it is preferred to use the sodium vanadates. Although the alkali metal salts of ortho-, meta-, or pyrovanadic acid may be used, it is preferred to employ the orthovanadates, particularly sodium orthovanadate. The amount of vanadate employed is not critical, but may vary over a wide range from about 2 to about 25% by weight of the polymer, although it is generally preferred to use from about 5 to about 20% by weight. The vanadate may be dispersed in the polymer composition by any of the usual methods; for example, by mixing it with the solid plastic polymer on a roll mill, or by adding the vanadate in finely divided form to a solution of the polymer in a suitable organic solvent. The vanadate may also be mixed with the polymer by adding it either as a solid or in the form of an aqueous solution or dispersion to an aqueous dispersion of the acrylic ester polymer.

The polymers to which my new process may be applied include any plastic or fusible polymers made by the polymerization of an ester of acrylic acid. Although some esters of acrylic acid, for example, allyl acrylate or ethylene glycol diacrylate may be polymerized to give a hard, brittle material having a very high melting point, it is also possible to obtain plastic or fusible polymers from such esters; these plastic polymers may be treated by the process of my invention in order to toughen them. The process of this invention is of greatest importance, however, when applied to plastic polymers made by the polymerization of monoesters of acrylic acid having the structure

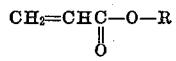

where R is an organic radical having the free valence on a carbon atom and is free from olefinic and acetylenic unsaturation. Among such polymers are those made by the polymerization of phenyl acrylate, benzyl acrylate, 2-phenoxy-ethyl acrylate, carboxymethyl acrylate, beta-phenylethyl acrylate, carbethoxymethyl acrylate, 2-chlorethyl acrylate, beta-diethylaminoethyl acrylate, tetrahydrafurfuryl acrylate, 2-methoxyethyl acrylate, 2-ethoxyethyl acrylate, 2-butoxyethyl acrylate, 2-cyanoethyl acrylate, 2-hydroxyethyl acrylate, 3-chloropropyl acrylate, 2,2'-dichlorisopropyl acrylate, 2-methoxyethyl acrylate, 2-ethoxyethyl acrylate, cyclohexyl acrylate, and similar compounds. More particularly, plastic polymers of esters of acrylic acid with saturated aliphatic monohydric alcohols are preferred; the most important of these are polymers of alkyl esters of acrylic acid. Among the alkyl acrylates are, for example, methyl acrylate, ethyl acrylate, n-propyl acrylate, isopropyl acrylate, n-butyl acrylate, isobutyl acrylate, n-amyl acrylate, 2-ethylhexyl acrylate, lauryl acrylate, n-octadecyl acrylate, and the like.

All of the foregoing esters of acrylic acid may be polymerized by the methods commonly employed for polymerization of methyl acrylate. The esters themselves may be prepared in a conventional manner by reacting the appropriate alcohols with acrylic acid or acrylic acid chloride under esterification conditions, or by alcoholysis of methyl acrylate with the appropriate alcohols, or by other known methods. The polymer need not be made solely from any one of the foregoing esters, but may be a mixed polymer prepared by copolymerizing two or more of the esters; moreover, mixed polymers of any one or more of the foregoing acrylic esters with any ethylenic compound copolymerizable therewith are also within the scope of my invention, provided that a substantial proportion of the acrylic ester is present in the polymer, preferably more than 50% by weight. Among the ethylenic compounds which may be copolymerized with the acrylic esters are, for example, vinyl halides, vinyl esters, vinylidene halides, and the like.

As an example of the process of this invention, a plastic polymer of ethyl acrylate was prepared by mixing 100 parts by weight of ethyl acrylate with about 0.005 part of benzoyl peroxide. The mixture was placed in an internal mixer equipped with a reflux condenser, and stirred at the reflux temperature (about 100° C.) until it became a doughy plastic mass. The stirring was then stopped, and the mass heated until any residual monomeric ethyl acrylate had evaporated. In 100 parts by weight of the resulting polymer, there was incorporated about 10 parts by weight of sodium orthovanadate. This incorporation may be carried out on a roll mill or in an internal mixer or in any other suitable manner. The resulting mixture was then cured by heating in a press at 275° F. for 60 minutes. The cured composition was similar in appearance and resiliency to vulcanized natural rubber. Similar results may be obtained with other acrylic ester polymers.

Any of the usual pigments and fillers commonly used in the rubber and plastic industry may be added to the composition without any deleterious effect upon the vulcanization process. Softeners, plasticizers and other ingredients may also be employed if so desired.

The time and temperature at which the composition need be heated in order to bring about the desired change in properties varies with the particular polymer employed as well as with the kind and amount of vanadate in the composition. Although the process may be carried out by heating the composition for a very long time at temperatures below 200° F., for practical purposes it is generally necessary to employ a temperature from about 200° F. to about 400° F., preferably from about 250° to about 325° F. At these temperatures the time required to obtain the desired results varies between about 15 minutes and two hours, depending upon the particular temperature and the polymer composition employed.

The product adheres strongly to many materials such as wood and textile fabrics, and can therefore be used in the manufacture of composite products, such as are made from rubber, and in cases in which it does not adhere directly, it can be secured to other materials by means of adhesive cement, such as solutions of chlorinated rubber. The product is accordingly useful in the manufacture of such typical articles as impregnated and coated fabrics, molded goods in great variety, belting, hose, pneumatic tires, flooring, and many others.

This application is a continuation-in-part of my copending application, Serial No. 479,910, filed March 20, 1943.

Although I have herein disclosed specific embodiments of my invention, I do not intend to limit myself solely thereto, but to include all of the obvious variations and modifications falling within the spirit and scope of the appended claims.

I claim:

1. The process of curing a plastic polymer of an ester of acrylic acid which comprises heating the polymer with from 2 to 25% by weight of an alkali metal salt of vanadic acid.

2. The process of curing a plastic polymer of a mono-ester of acrylic acid having the structure

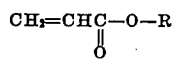

where R is an organic radical having the free valence on a carbon atom and is free from olefinic and acetylenic unsaturation, which comprises heating the polymer with from 2 to 25% by weight of an alkali metal salt of vanadic acid.

3. The process of curing a plastic polymer of a saturated aliphatic monohydric alcohol ester of acrylic acid, which comprises heating said polymer with from 2 to 25% by weight of an alkali metal salt of vanadic acid.

4. The process of curing a plastic polymer of a saturated aliphatic monohydric alcohol ester of acrylic acid, which comprises heating said polymer with from 2 to 25% by weight of sodium orthovanadate.

5. The process of curing a plastic polymer of an alkyl ester of acrylic acid, which comprises heating said polymer with from 2 to 25% by weight of an alkali metal salt of vanadic acid.

6. The process of curing a plastic polymer of an alkyl ester of acrylic acid, which comprises heating said polymer with from 2 to 25% by weight of sodium orthovanadate.

7. The process of curing a plastic polymer of ethyl acrylate, which comprises heating said polymer with from 2 to 25% by weight of an alkali metal salt of vanadic acid.

8. The process of curing a plastic polymer of ethyl acrylate, which comprises heating said polymer with from 2 to 25% by weight of sodium orthovanadate.

9. The process of curing a plastic polymer of a saturated aliphatic monohydric alcohol ester of acrylic acid, which comprises heating said polymer at about 250° to 325° F. with from 2 to 25% by weight of an alkali metal salt of vanadic acid.

10. The process of curing a plastic polymer of a saturated aliphatic monohydric alcohol ester of acrylic acid, which comprises heating said polymer at about 250° to about 325° F. with from 2 to 25% by weight of sodium orthovanadate.

11. A cured polymer composition made by heating a plastic polymer of an ester of acrylic acid with from 2 to 25% by weight of an alkali metal salt of vanadic acid.

12. A cured polymer composition made by heating a plastic polymer of a mono-ester of acrylic acid having the structure

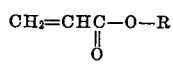

where R is an organic radical having the free valence on a carbon atom and is free from olefinic and acetylenic unsaturation with from 2 to 25% by weight of an alkali metal salt of vanadic acid.

13. A cured polymer composition made by heating a plastic polymer of a saturated aliphatic monohydric alcohol ester of acrylic acid with from 2 to 25% by weight of an alkali metal salt of vanadic acid.

14. A cured polymer composition made by heating a plastic polymer of a saturated aliphatic monohydric alcohol ester of acrylic acid with from 2 to 25% by weight of sodium orthovanadate.

15. A cured polymer composition made by heating a plastic polymer of an alkyl ester of acrylic acid with from 2 to 25% by weight of an alkali metal salt of vanadic acid.

16. A cured polymer composition made by heating a plastic polymer of an alkyl ester of acrylic acid with from 2 to 25% by weight of sodium orthovanadate.

17. A cured polymer composition made by heating a plastic polymer of ethyl acrylate with from 2 to 25% by weight of sodium orthovanadate.

18. A cured polymer composition made by heating a plastic polymer of a saturated aliphatic monohydric alcohol ester of acrylic acid at about 250° to about 325° F. with from 2 to 25% by weight of alkali metal salt of vanadic acid.

STEPHEN T. SEMEGEN.